Oct. 29, 1946.  L. V. McDONNELL ET AL  2,410,120
METHOD OF ATTACHING CLIPS
Filed Oct. 29, 1943
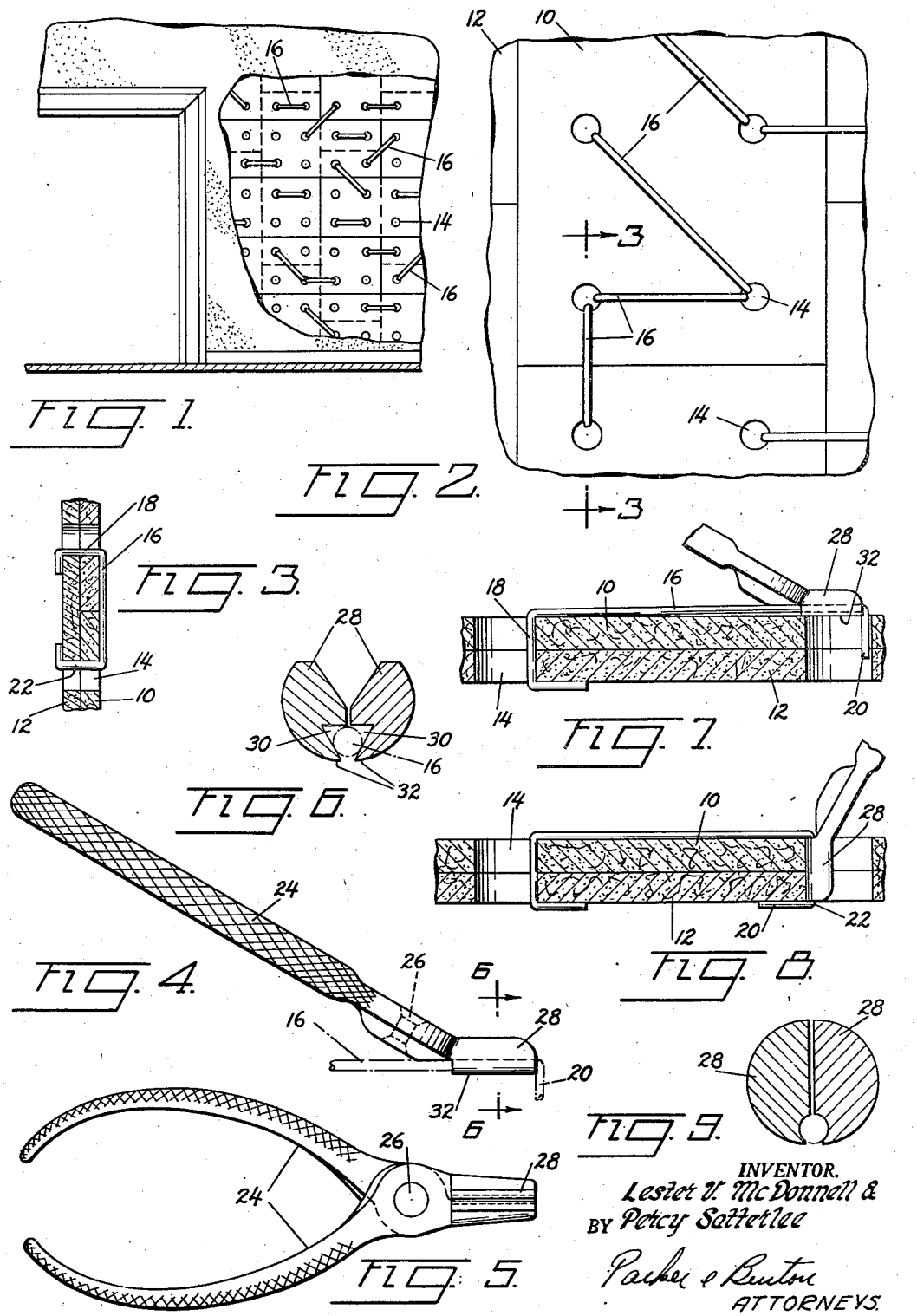
INVENTOR.
Lester V. McDonnell &
BY Percy Satterlee
Parker & Burton
ATTORNEYS.

Patented Oct. 29, 1946

2,410,120

UNITED STATES PATENT OFFICE 2,410,120

METHOD OF ATTACHING CLIPS

Lester V. McDonnell and Percy Satterlee, Detroit, Mich.

Application October 29, 1943, Serial No. 508,100

6 Claims. (Cl. 153—1)

This invention relates to an improved method of attaching a clip in place to secure a plurality of apertured sheets or laminations in overlying relationship.

An object is to provide improved method of securing two or more sheets or laminations of material securely together in overlying relationship, and to do so rapidly and economically.

This invention is designed to securely fasten two apertured plies of sheet material together, so that the connecting means exerts a holding tension upon the sheets. An example of multiply sheet material with which the invention is usable is that of a multiply foundation core for a wall or partition structure as illustrated in U. S. patent of Nicholson 2,347,276 April 25, 1944.

The invention is further designed to accomplish the securing together of a plurality of plies of apertured sheet material with a minimum of labor and time. The invention embodies an improved method of securing a particular partially formed clip through registering apertures in a plurality of plies of material to secure the several plies together.

Other objects, advantages and meritorious features will more fully appear from the following description appended claims, and accompanying drawing wherein:

Fig. 1 is an elevation partly broken away of a wall structure showing a multiply foundation core provided with the improved clip.

Fig. 2 is a fragmentary elevation of a wall foundation core provided with the improved clip.

Fig. 3 is a sectional view taken on the line 3—3 of Fig. 2.

Fig. 4 is an elevation of an improved tool, illustrating the first step in the application of the clip.

Fig. 5 is another elevation of the improved tool shown in Fig. 4.

Fig. 6 is a sectional view taken on the line 6—6 of Fig. 4.

Fig. 7 illustrates the second step in the application of the clip.

Fig. 8 illustrates the final step in the application of the clip.

Fig. 9 is a section taken on the same line as Fig. 6 through a modified form of tool.

In securing a plurality of plies of sheet material in overlying relationship, such as the two plies 10 and 12 shown in the drawing, which form the foundation of a wall or partition structure, it is desirable that such plies be securely held and tensioned together, and such operation be economically and rapidly accomplished with a minimum of labor and workers. Two core plies 10 and 12 may be formed of gypsum board or other suitable core material and are provided with registering apertures 14. In Fig. 1 the coating of plaster is shown as applied to the outer surface of the two ply core structure. Such a coating is applied to both sides of the core.

To secure the two laminations of core sheet material together clips 16 of the character illustrated in the figures are provided. Such a clip is formed of deformable material such as metal wire. It is provided at one end with a U-shaped hook 18 which hook is of a size to snugly fit over the two plies of material as shown in Figs. 7 and 8. The opposite end of the clip is bent at a right angle to the base as at 20. In the attachment of the clip in position the base adjacent to the end 20 is bent over to form a U-shaped hook portion 22, which is complementary to the hook portion 18, and which is adapted to grip the two plies together in a manner corresponding with the hook 18 as heretofore described. The shaping of such opposite end of the clip into a U-shaped hook foundation is accomplished in a particular manner and with a particular tool, and against the core sheets themselves, causing the clip when attached to exert a holding tension on the sheets. The apertures 14 serve not only to receive the two ends of the clip but also serve as apertures through which the plaster coatings are keyed together through the foundation core.

In Figs. 4 to 8 inclusive the method of attachment of the clip and the improved tool by means of which it is attached in place are shown. Such tool is in the general form of a pair of pliers having handle portions 24, a pivot connection 26, and clip gripping jaws 28. These jaws extend angularly with respect to the plane of the handle as shown in Figs. 4, 7, and 8. The jaws are provided on their meeting faces with complementary longitudinal extending wire receiving grooves or channels 30, adapted to receive the clip wire 16 as illustrated particularly in Figs. 4 to 6. The jaws have a length sustantially equal to the combined thickness of the two core sheets through which the clip is to be extended as shown particularly in Fig. 8, and equal to the length of that portion of the clip which over-hangs the aperture.

In the attachment of the clip in place that portion of the base of the clip adjacent to its end portion 20 is gripped by the jaws of the tool as illustrated in Fig. 4. The ends of the jaws of the tool abut the end portion 20 of the clip as shown in Figs. 4 to 7. The clip wire is disposed within the grooves 30 of the jaws and is held so that the clip wire is substantially flush with the bearing face 32 of the jaws as shown in Fig. 6.

The hook end of the clip is inserted through an aperture 14 through both plies and drawn down to a seat as shown in Fig. 7, gripping both plies of the sheet material snugly together. The hook end of the clip has such a dimension as to form a snug fit over the two plies. Such plies are here illustrated as independent plies which have been juxtaposed and the apertures aligned. This position of the tool is shown in Fig. 7. The tool is used to grip the clip as shown in Figs. 4 and 7, and the hook end of the clip is inserted through the aperture as above described by the tool. In this position it will be seen that the base of the clip extends from one pair of apertures 14 across the outer face of one sheet to a spaced pair of apertures 14, and that end portion of the base opposite the hook over-hangs such spaced pair of apertures. The jaws of the tool extend over the spaced pair of apertures as shown in Fig. 7, and the bearing face of the jaws bears upon the margin of the aperture as shown in Fig. 7.

The tool is then rocked from the position as shown in Fig. 7 to that shown in Fig. 8, bending the base of the clip about the margin of the aperture and drawing the clip tightly across the space between the two pairs of apertures. As the tool is rocked from the position of Fig. 7 to that of Fig. 8 the end portion 20 of the clip is bent to engage the opposite surface of the sheets and such end portion of the clip is shaped into a substantially U-shaped hook 22, which is complementary to the U-shaped hook 18.

Inasmuch as the jaws of the tool have a length along their bearing face substantially equal to the thickness of the two plies of the core material through the apertures 14, that portion of the base of the clip which is bent through such aperture substantially equals such thickness dimension, and the end portion 20 is urged snugly against the opposite side of such plies as shown in Fig. 8. Inasmuch as the wire clip is held substantially flush with the bearing face 32 of the jaws as shown in Fig. 6, the hook portion formed in the attaching operation snugly engages the apertures through the sheets when the tool is removed as shown in Fig. 3.

The base of the clip has a length slightly less than the dimension to be spanned thereby and to extend through the thickness of the two sheets at the apertures, so that when the clip is inserted as shown, a tension is imposed by clip upon the sheets holding them snugly together.

Fig. 9 illustrates a modified form of construction wherein the clip holding groove in the jaws is arcuate instead of angular in transverse section.

What we claim is:

1. That method of securing two juxtaposed sheets of material provided with spaced apart registering apertures securely in juxtaposition comprising providing a wire clip having a U-shaped hook at one end and having its opposite end bent at a right angle to the base of the clip, inserting the hook end of the clip through one pair of registering apertures of the two sheets and drawing said hook to a seat over said sheets binding the two sheets together, and drawing the base of the clip across one sheet with its opposite end over-hanging a spaced pair of registering apertures, gripping the base of the clip adjacent to such spaced end and over said pair of apertures and through a distance approximating the thickness of the two sheets through said apertures, and bending the gripped portion of the base of the clip angularly relative to the ungripped portion of the base forcing said gripped portion of the clip through said apertures thus forming a hooked end thereon for holding the two sheets together adjacent to said apertures.

2. That method of securing two juxtaposed sheets provided with spaced apart registering apertures securely in juxtaposition comprising providing a clip of deformable material having a base provided with a U-shaped hook at one end and having its opposite end bent to extend in the same direction away from the base as the U-shaped hook and at a right angle angularly with respect to its base, said base of the clip having a length which exceeds the space between the apertures by approximately the thickness of the two sheets, inserting said hooked end through one pair of registering apertures and drawing said hook to a seat snugly over said two sheets, gripping the base of the clip adjacent to its opposite end and over the other pair of apertures and throughout a distance approximating the thickness of the two sheets and bending the gripped portion of the base of the clip angularly with respect to the ungripped portion of the base forcing said end of the clip through said apertures and bending said base over the aperture margins and urging the bent end of the clip against the opposite surface of the sheets.

3. That method of securing two juxtaposed sheets provided with spaced apart registering apertures securely in juxtaposition comprising providing a clip of deformable material having a base of a length slightly less than the distance between the spaced apertures plus the thickness of the two sheets, said base provided with a preformed U-shaped hook at one end and a preformed right angle portion at the opposite end, inserting said hook end through a pair of registering apertures and drawing the same snugly to seat over the two sheets, gripping that portion of the base of the clip adjacent to said right angle portion which projects over a pair of spaced registering apertures and bending said gripped portion relative to the ungripped portion of the base and forcing said gripped end of the clip through said apertures and forming a U-shaped hook on said end and causing said hook to snugly engage the opposite sides of said two sheets adjacent to said apertures.

4. That method of securing two juxtaposed sheets provided with spaced apart registering apertures securely in juxtaposition comprising providing a clip of deformable material with a preformed U-shaped hook at one end and a preformed right angle portion at the opposite end, inserting said hook through one pair of registering apertures and drawing the same over the two sheets holding them snugly together adjacent to said apertures, bending the clip adjacent to and spaced from its opposite and right angle end portion through a spaced pair of registering apertures forming a hook on the clip and urging said hook snugly against said two sheets adjacent to said apertures.

5. That method of securing two juxtaposed sheets of material provided with spaced pairs of registering apertures securely together comprising providing a metal clip having a U-shaped hook at one end and having a base of a length greater than the distance between said spaced pairs of apertures, inserting the hook end of the clip through one pair of registering apertures and drawing the hook to a seat thereover and drawing the base of the clip across one sheet with the end opposite the hook overhanging the spaced pair of registering apertures, gripping that portion of the base of the clip which overhangs said registering apertures and bending the same therethrough along a line spaced from the hook end of the clip a distance not greater than the shortest distance between said two pairs of registering apertures securing said two sheets together.

6. That method of securing two edge abutting sheets of material each provided with a clip receiving aperture spaced from said abutting edges securely together comprising providing a metal clip having a U-shaped hook at one end, inserting the hook end of the clip through the aperture in one sheet and drawing the same to a seat against the edge of the aperture, drawing the base of the clip across the edge abutting portions of the two sheets between the two apertures with the opposite end of the clip overhanging the second aperture, gripping that portion of the clip overhanging the second aperture and bending said gripped portion through the aperture into engagement with the edge thereof and along a line spaced from the hook end of the clip a distance approximating the shortest distance between said apertures.

LESTER V. McDONNELL.
PERCY SATTERLEE.